US012330113B2

(12) United States Patent
Aldayini et al.

(10) Patent No.: US 12,330,113 B2
(45) Date of Patent: Jun. 17, 2025

(54) METHOD AND SYSTEM FOR MAINTAINING SOLVENT QUALITY IN GAS TREATING SYSTEMS

(71) Applicant: SAUDI ARABIAN OIL COMPANY, Dhahran (SA)

(72) Inventors: Abdulaziz A. Aldayini, Khobar (SA); Muntazer N. Alalawi, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 479 days.

(21) Appl. No.: 17/719,893

(22) Filed: Apr. 13, 2022

(65) Prior Publication Data
US 2023/0330590 A1    Oct. 19, 2023

(51) Int. Cl.
| B01D 53/14 | (2006.01) |
| B01D 53/18 | (2006.01) |
| B01D 53/52 | (2006.01) |
| B01D 53/62 | (2006.01) |
| B01D 53/96 | (2006.01) |

(52) U.S. Cl.
CPC ..... *B01D 53/1412* (2013.01); *B01D 53/1462* (2013.01); *B01D 53/526* (2013.01); *B01D 53/62* (2013.01); *B01D 53/96* (2013.01); *B01D 53/18* (2013.01); *B01D 2252/204* (2013.01); *B01D 2252/20405* (2013.01); *B01D 2252/20431* (2013.01); *B01D 2252/20489* (2013.01);
(Continued)

(58) Field of Classification Search
CPC .......... B01D 53/1425; B01D 2252/204; B01D 53/18; B01D 53/1412; B01D 53/1462; B01D 53/526; B01D 53/62; B01D 53/96; B01D 2252/20405; B01D 2252/20431; B01D 2252/20489; B01D 2257/304; B01D 2257/504; C10G 2300/44
See application file for complete search history.

(56) References Cited

U.S. PATENT DOCUMENTS

| 9,568,401 B2 | 2/2017 | Angros |
| 9,737,496 B2 | 8/2017 | Scott et al. |

(Continued)

FOREIGN PATENT DOCUMENTS

| CN | 101362047 A | * | 2/2009 | |
| JP | 2006218415 A | | 8/2006 | |
| WO | WO-2018130318 A1 | * | 7/2018 | ............. G01F 23/24 |

OTHER PUBLICATIONS

Choi et al. (Consistency Index-Based Sensor Fault Detection System for Nuclear Power Plant Emergency Situations Using an LSTM Network. Sensors, Mar. 16, 2020, 20, 1651. https://doi.org/10.3390/s20061651) (Year: 2020).*

(Continued)

*Primary Examiner* — Lisa M Caputo
*Assistant Examiner* — Christian T Bryant
(74) *Attorney, Agent, or Firm* — Osha Bergman Watanabe & Burton LLP

(57) ABSTRACT

A method for maintaining solvent quality in a gas treating system involves calculating, by an advisory system for continuous monitoring of the gas treating system, a water content deficit in the solvent of the gas treating system, calculating, by the advisory system, a water makeup rate compensating for the water content deficit, and displaying, in an interactive user interface of the advisory system, the water makeup rate.

13 Claims, 5 Drawing Sheets

(52) U.S. Cl.
CPC .. *B01D 2257/304* (2013.01); *B01D 2257/504* (2013.01); *C10G 2300/44* (2013.01)

(56) References Cited

U.S. PATENT DOCUMENTS

| | | | |
|---|---|---|---|
| 2001/0021362 A1* | 9/2001 | Ishida | B01D 53/1412 |
| | | | 423/228 |
| 2008/0276155 A1* | 11/2008 | Shim | G05B 23/0275 |
| | | | 714/E11.032 |
| 2012/0010757 A1 | 1/2012 | Francino et al. | |
| 2012/0245737 A1* | 9/2012 | Liu | B01D 53/1412 |
| | | | 700/271 |
| 2013/0167619 A1 | 7/2013 | Spasova | |
| 2015/0118131 A1* | 4/2015 | Martin | B01D 53/1456 |
| | | | 422/187 |
| 2017/0364043 A1 | 12/2017 | Ganti et al. | |
| 2018/0356151 A1 | 12/2018 | Suraganda Narayana et al. | |
| 2020/0040787 A1* | 2/2020 | Brandt | G01N 29/4427 |
| 2020/0061523 A1* | 2/2020 | Cullinane | B01D 53/1406 |
| 2020/0071242 A1* | 3/2020 | Patel | B01J 8/0457 |

OTHER PUBLICATIONS

Cadours et al. ("Amine Unit Optimization with High Performance Solvent." Paper presented at the Abu Dhabi International Petroleum Exhibition and Conference, Abu Dhabi, UAE, Nov. 2014. doi: https://doi.org/10.2118/171784-MS) (Year: 2014).*

First Examination Report issued in Saudi Arabian Application No. 123446928, dated May 30, 2024 (6 pages).

Siemens, Siemens Digital Worker, Asset Performance Management, Mobile Operations Concept and Operations Intelligence with SIMATIC PCS 7, COMOS MRO and XHQ (Video); Jun. 18, 2021; <https://support.industry.siemens.com/cs/document/109744564/siemens-digital-worker-asset-performance-management-mobile-operations-concept-and-operations-intelligence-with-simatic-pcs-7-comos-mro-and-xhq-(video)?dti=0&lc=en-Nl>; Accessed Nov. 23, 2021 (3 pages).

* cited by examiner

EXAMPLE USER INTERFACE

General Solvent Parameters

| PARAMETER | OPTIMUM LIMITS | UNIT | GT-100 | GT-200 | GT-300 | GT-400 |
|---|---|---|---|---|---|---|
| CURRENT SOUR GAS FEED | < 665 | MMSCFD | 650 | 652 | 621 | 650 |
| CURRENT TOTAL SOLVENT VOLUME | 740 - 790 | THOUSAND USG | 806,991 | 825,023 | 736,450 | 824,086 |
| CURRENT MDEA CONCENTRATION | 45 - 51 | WT% | 48.9 | 45.8 | 46.5 | 45.2 |
| CALCULATED WATER LOSSES | - | GPM | 8 | 7 | 10 | 10 |
| CURRENT CONDENSATE MAKEUP | 0 - 20 | GPM | 8 | 0 | 20 | 0 |

Today's AGR Solvent Recommendation

| ACTION | UNIT | GT-100 | GT-200 | GT-300 | GT-400 |
|---|---|---|---|---|---|
| TODAY'S RECOMMENDED CONDENSATE MAKEUP | GPM | 0 | 0 | 20 | 0 |
| TODAY'S RECOMMENDED MDEA INJECTION | USG | 0 | 0 | 0 | 0 |

Manual Condensate Makeup Calculation

| PARAMETER | UNIT | GT-100 | GT-200 | GT-300 | GT-400 |
|---|---|---|---|---|---|
| ADJUSTED CONDENSATE MAKEUP | GPM | 12 | | | |
| ADJUSTED TOTAL SOLVENT VOLUME | USG | 810,421 | | | |
| VOLUME CHANGE (AFTER 24H) | USG/DAY | 5,969 | #VALUE! | #VALUE! | #VALUE! |

Weekly Condensate Makeup Forecast

| | TRAIN 100 | | TRAIN 200 | | TRAIN 300 | | TRAIN 400 | |
|---|---|---|---|---|---|---|---|---|
| | REQUIRED MAKEUP RATE | TOTAL SOLVENT VOLUME (AFTER 24H) | REQUIRED MAKEUP RATE | TOTAL SOLVENT VOLUME (AFTER 24H) | REQUIRED MAKEUP RATE | TOTAL SOLVENT VOLUME (AFTER 24H) | REQUIRED MAKEUP RATE | TOTAL SOLVENT VOLUME (AFTER 24H) |
| DAY 1 | 0 | 793,903 | 0 | 813,633 | 20 | 748,464 | 0 | 809,224 |
| DAY 2 | 0 | 782,590 | 0 | 803,723 | 20 | 762,452 | 0 | 794,830 |
| DAY 3 | 0 | 771,276 | 0 | 793,814 | 20 | 776,439 | 0 | 780,437 |
| DAY 4 | 5 | 774,783 | 0 | 783,904 | 19 | 787,924 | 0 | 766,044 |
| DAY 5 | 8 | 778,686 | 0 | 773,995 | 10 | 775,188 | 7 | 770,776 |
| DAY 6 | 8 | 778,686 | 4 | 776,277 | 10 | 775,188 | 10 | 775,607 |
| DAY 7 | 8 | 778,686 | 7 | 780,091 | 10 | 775,188 | 10 | 775,607 |

Healthiness of Level Transmitters

| EQUIPMENT | GT-100 | GT-200 | GT-300 | GT-400 |
|---|---|---|---|---|
| AGR CONTACTOR (C-X31) | HEALTHY | HEALTHY | UNHEALTHY | HEALTHY |
| AGR HC FLASH DRUM (D-X33) | HEALTHY | HEALTHY | HEALTHY | HEALTHY |
| AGR ENRICHMENT FLASH DRUM (D-X42) | HEALTHY | HEALTHY | HEALTHY | HEALTHY |
| AGR ENRICHMENT CONTACTOR (C-X34) | HEALTHY | UNHEALTHY | HEALTHY | UNHEALTHY |
| AGR STRIPPER (C-X32) | UNHEALTHY | HEALTHY | #VALUE! | HEALTHY |

FIG. 3

METHOD AND SYSTEM FOR MAINTAINING SOLVENT QUALITY IN GAS TREATING SYSTEMS

BACKGROUND

Amine gas treating is a process that is widely used in refineries, petrochemical plants, natural gas processing plants, and other applications. Amine gas treating, also known as amine scrubbing, gas sweetening, and acid gas removal, is a processes that uses a solvent (e.g., an aqueous amine solution) to remove hydrogen sulfide, carbon dioxide, and other "acid gases", from hydrocarbon gas streams. Gas streams containing one or more of the acid gases may be referred to as "sour gas" whether it is from a natural or a fabricated source.

While the fully regenerable solvent may not consumed during the acid gas removal process, certain types of loss may occur, e.g., due to vaporization, entrainment etc. If not monitored and corrected, the volume and/or composition of the solvent may change over time. Accordingly, it may be desirable to monitor key parameters of the solvent in order to keep the acid gas removal process operating as intended.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for maintaining solvent quality in a gas treating system, the method comprising: calculating, by an advisory system for continuous monitoring of the gas treating system, a water content deficit in the solvent of the gas treating system; calculating, by the advisory system, a water makeup rate compensating for the water content deficit; and displaying, in an interactive user interface of the advisory system, the water makeup rate.

In general, in one aspect, embodiments relate to a system for maintaining solvent quality in a gas treating system, the system comprising: an advisory system for continuous monitoring of the gas treating system, the advisory system comprising a processor, and configured to: calculate a water content deficit in the solvent of the gas treating system, and calculate a water makeup rate compensating for the water content deficit; and an interactive user interface configured to display the water makeup rate.

In general, in one aspect, embodiments relate to a non-transitory machine-readable medium comprising a plurality of machine-readable instructions executed by one or more processors of an advisory system, the plurality of machine-readable instructions causing the one or more processors to perform operations comprising: calculating a water content deficit in the solvent of the gas treating system; calculating a water makeup rate compensating for the water content deficit; and displaying, in an interactive user interface of the advisory system, the water makeup rate.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 3 shows an example of an interactive user interface in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for maintaining solvent quality in gas treating systems. Gas treatment may be used for treating sour gas (a mix that may include hydrogen sulfide ($H_2S$) and/or carbon dioxide ($CO_2$) in addition to the hydrocarbons) to obtain sweet gas (hydrocarbons only). Frequently, an aqueous solution (solvent) that includes amines is used to remove the $H_2S$ and/or $CO_2$ from the sour gas.

During the operation of a gas treating system, there may be losses and/or degradation of the solvent. For example, there may be evaporation, overhead loss of the amine, etc., which may result in a change in the total volume of solvent in the system and/or a change in the composition of the solvent. One or more embodiments of the disclosure include systems and methods for handling key solvent parameters to optimize the operation of the gas treating system, reduce cost, etc. An advisory system, in accordance with one or more embodiments, provides continuous monitoring and recommendations to keep the solvent parameters in a desired range. Solvent parameters that are outside a specified range may be pointed out to the user, enabling the user to take corrective action. Further, one or more embodiments of the disclosure provide a forecast of the condensate makeup in the gas treating system, along with a projected total solvent volume in order to facilitate keeping the solvent parameters within the desired range. Embodiments of the disclosure may, thus, help reduce overhead losses and solvent degradation. A detailed description is subsequently provided.

Figure 1:
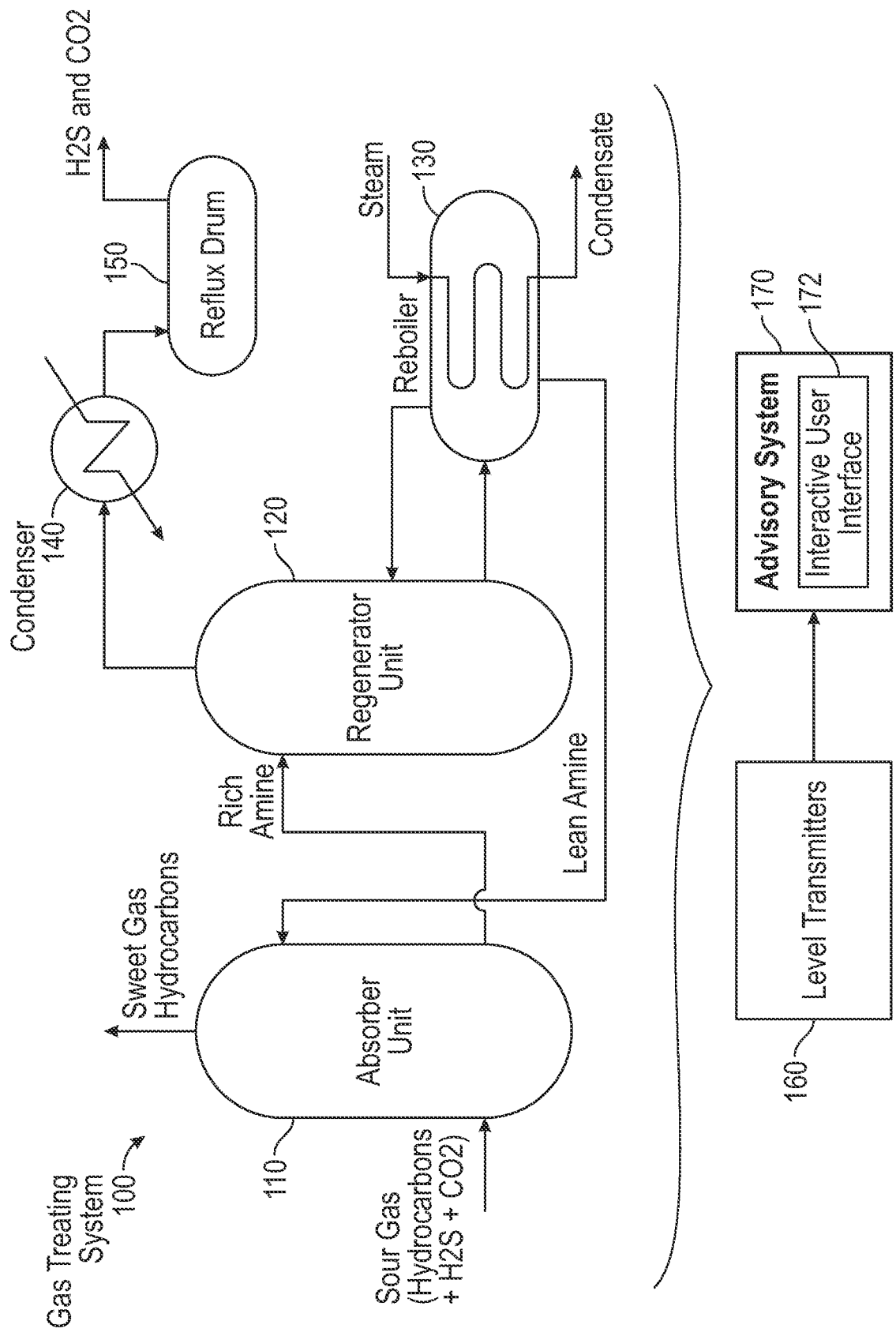
FIG. 1 shows a gas treating system in accordance with one or more embodiments.

Turning to FIG. 1, FIG. 1 shows a schematic diagram of a gas treating system (100), in accordance with one or more embodiments. The gas treatment, in one or more embodiments, involves an acid-base reaction. The acid-base reaction between the amine in the solvent and the acidic gases ($H_2S$ and/or $CO_2$) results in dissociation and ionization. The dissociated and ionized species are soluble and may be trapped in the amine solution for easy removal from the gas phase. Various types of amines may be used. In one embodiment, the amine is Methyl Diethanolamine (MDEA). The gas treating system (100) provides the environment for continuously performing the described reaction in a repeating cycle. In the absorber unit (110), the downflowing amine solution absorbs $H_2S$ and $CO_2$ from the upflowing sour gas to produce a sweetened gas stream (i.e., a gas free of hydrogen sulfide and carbon dioxide) as a product and an amine solution rich in the absorbed acid gases. The resultant "rich" amine is routed into the regenerator unit (120) to produce regenerated or "lean" amine that is recycled for reuse in the absorber unit (110). More specifically, in the regenerator unit (120), the solvent is stripped with stream under low pressure to remove the absorbed gas. The stripped overhead gas from the regenerator is concentrated $H_2S$ and/or $CO_2$. A reboiler (130) may be used to supply the heat required for the operation of the regenerator unit (120) at the bottom of the regenerator unit (120), and the condenser (140) may remove the heat at the top of the regenerator unit (120). The resulting condensate may be temporarily collected in the reflux drum (150), from where the $H_2S$ and/or $CO_2$ may be collected or released in a gaseous form.

In one or more embodiments, any of the components that hold solvent in liquid form may include a level transmitter (160). The level transmitter may identify the level of solvent in the solvent-holding component and may transmit the identified level to the advisory system (170). With the geometry of the solvent-holding component being known, the current volume of solvent in the component may be computed. The combination of the current volumes of solvent in the solvent-holding components is the total solvent volume.

Figure 4:
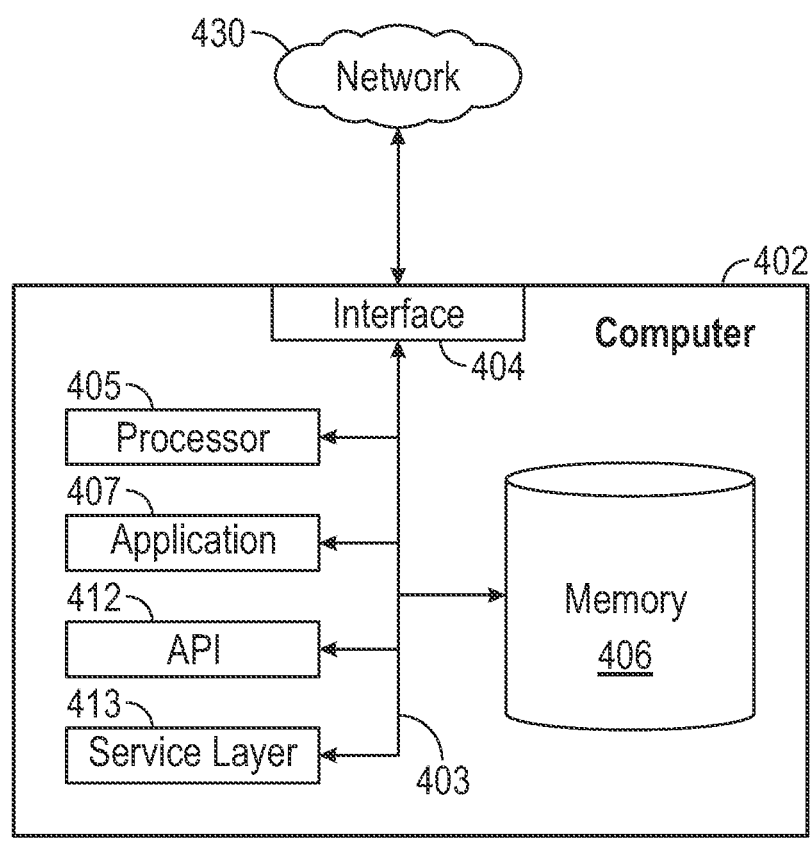
FIG. 4 shows a computer system in accordance with one or more embodiments.

The advisory system (170) may be a computer system that includes components as shown in FIG. 4. The computer system (170) may execute instructions, e.g., based on the flowcharts of FIGS. 2A and 2B. The instructions may be stored on a non-transitory machine-readable medium. The advisory system (170) may include an interactive user interface (172), as discussed in reference to FIG. 3.

While FIG. 1 shows a particular configuration of components of a gas treating system, other configurations may be used without departing from the scope of the disclosure.

Figure 2A:
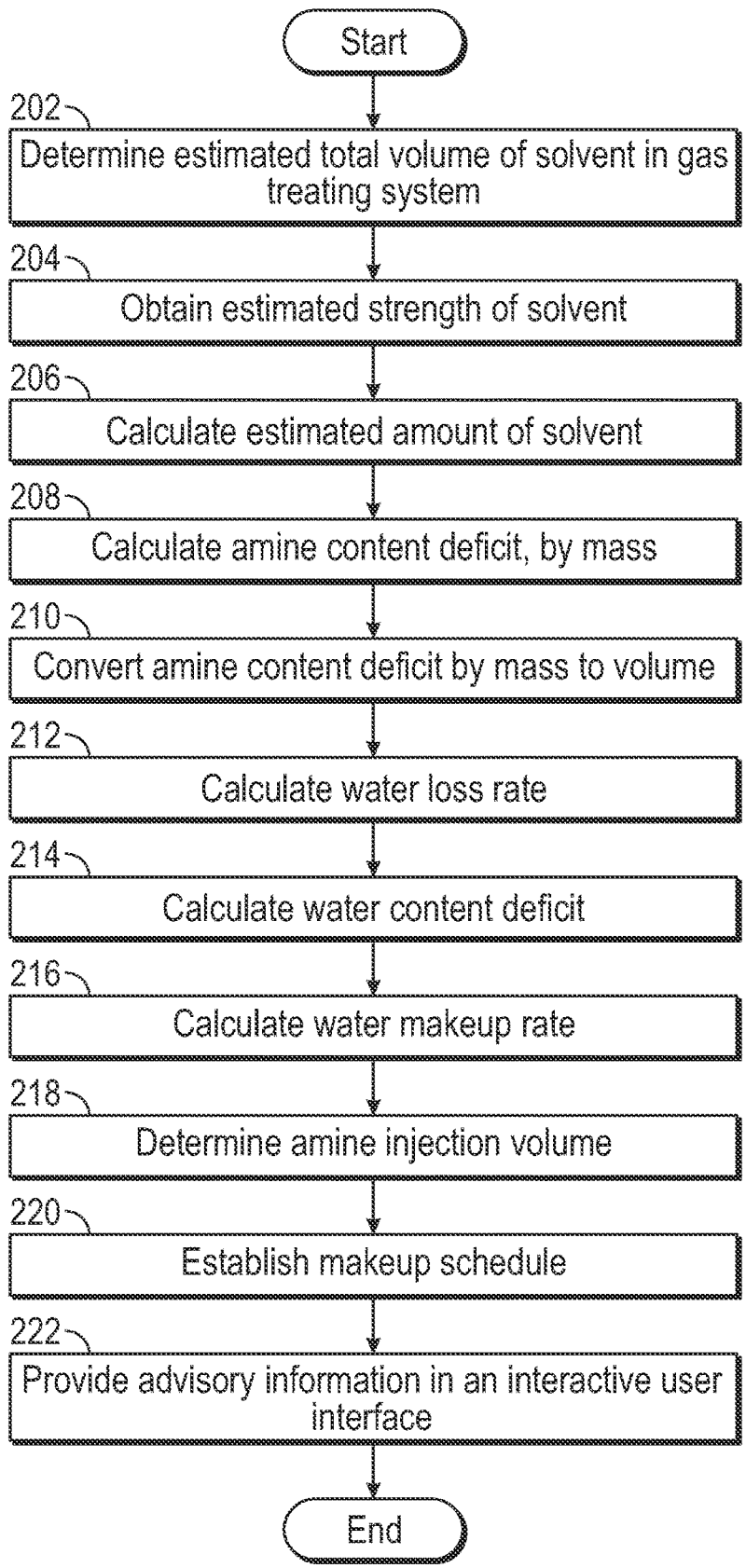
FIGS. 2A and 2B show flowcharts for methods in accordance with one or more embodiments.
Figure 2B:
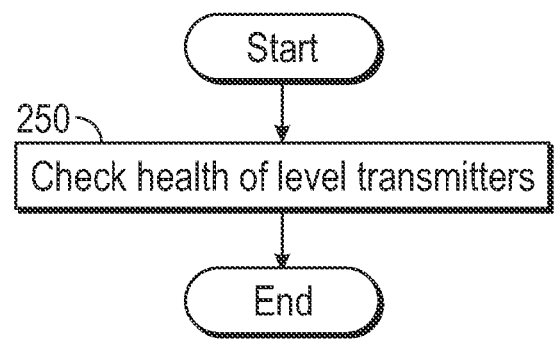

FIGS. 2A and 2B show flowcharts in accordance with one or more embodiments. The flowcharts of FIGS. 2A and 2B introduces operations performed to maintain solvent quality in gas treating systems, in accordance with one or more embodiments. One or more blocks in FIGS. 2A and 2B may be performed by the advisory system (170). While the various blocks in FIGS. 2A and 2B are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

The operations described in reference to FIGS. 2A and 2B may be repeatedly executed, for example, in a loop, thereby enabling a continuous (24/7) monitoring of gas treating systems, including recommendations for maintaining a solvent (chemicals and condensate) to meet product specifications and resulting in chemical optimization. More specifically, the operations may result in a process optimization targeting the composition of the total solvent. By maintaining the proper amine concentration, amine losses due to vaporization may be minimized because water will may evaporate instead. In addition, maintaining the proper amine concentration will result in heat being absorbed by the water rather than by the amine, thereby reducing or avoiding the degradation of the amine. Further, by maintaining the proper amine concentration, maximum removal of $H_2S$ and/or $CO_2$ from the sour gas is facilitated. The operations of FIG. 2B may be executed independent from the operations of FIG. 2A. Alternatively, the operations of FIG. 2B may be executed as part of the operations of FIG. 2A.

The described operations may be implemented using any program language. For example, the described operations may be implemented in Excel, using macros.

In Block 202, an estimated total volume of solvent in the gas treating system is determined. The estimated total volume of solvent may closely correspond to the actual total volume of solvent in the gas treating system and may be obtained, for example, by multiplying the design volume of each of the components of the gas treating system with the measured fill level of each of the components. The measured fill level may be obtained from the level transmitters.

In Block 204, an estimated strength of the solvent is obtained. The estimated strength of the solvent may be obtained from a laboratory information management system (LIMS) database. Accordingly, the estimated strength of the solvent may be obtained through lab analysis and may correspond to the actual strength of the solvent. The estimated strength of the solvent may be expressed as a mass-percentage of the amine in the solvent.

In Block 206, an estimated amount of solvent in the gas treating system is calculated. The estimate may include an estimated amount of solvent in the gas treating system, an estimated amount of water in the gas treating system, and/or an estimated amount of MDEA in the gas treating system. The estimates may be calculated based on the estimated total volume of solvent (obtained in Block 202), the estimated strength of the solvent (obtained in Block 204), and the calculated density of the total solvent. The density of the total solvent may be calculated based on the MDEA concentration in the solvent and the known tabulated water and MDEA densities. The calculation is represented as the following $[\rho_{Water} \cdot x_{Water} + \rho_{MDEA} \cdot x_{MDEA}]$. After the execution of Block 206, estimates of the actual total mass of solvent, the actual total mass of amine, and the actual total mass of water may be available. The masses may be converted to volumes, where needed.

In Block 208, an amine content deficit, by mass, is determined. The amine content deficit may be determined by comparing the estimated amine mass content in the gas treating system against a desired amine mass in the gas treating system. An allowed operating limit of estimated amine content deficit is set based on the current total solvent volume before amine makeup is automatically recommended in the advisory system.

In Block 210, the amine content deficit by mass is converted to a volume. The volume may be used as the amine makeup, specified in, for example, U.S. gallons. The amine makeup may be reported to the user. In one embodiment, a test is performed to determine whether there is a deficit. The test involves checking whether the estimated amine content is less than the desired amine content. The test may be performed by volume or by mass. No amine makeup recommendation may be provided to the user if the estimated amine content is equal to or greater than the desired amine content.

In Block 212, a water loss rate is calculated. The water loss rate indicates a loss of water in the solvent over time. The water loss rate may be calculated based on mass balance and thermodynamic principles and may be a function of gas flow rates, overhead partial pressure and temperature in each of the columns (e.g., in the absorber unit and in the regenerator unit). The water loss rate is dependent on the water content in each of the outlet streams exiting the AGR system (Sweet Gas, Enrichment Gas, & Acid Gas) and the flowrates of those streams $$\left[ \dot{V}_{Enrichment\ Gas} \times \frac{10^6 \times 18.02}{379.46 \times 24 \times 60} \times m_{water} \times \frac{7.480519}{100 \times 62.37} \right].$$

Water content is calculated through the partial pressure of water content and total pressure of each of the outlet streams $$\left[ \frac{P_{Water}}{P_{Total} + 14.7} \times 100 \right].$$

Partial pressure of water is calculated using a steam table, which is incorporated in the advisory system as a programmed logic, and known temperatures of outlet streams. Steam table equations and the temperature of outlet streams (saturation temperature) may be utilized to calculate the partial pressure of the saturated water vapor. Any unit, such as U.S. gallons per minute (GPM), may be used to quantify the water loss rate.

In Block 214, a water content deficit is calculated. The water content deficit indicates a discrepancy between the desired amount of water and the estimated amount of water in the solvent. The desired amount of water may be specified as a range, and a deficit is detected when the estimated amount of water drops below the lower bound of the range. The water content deficit may be calculated based on the water loss rate obtained in Block 214, and may be expressed using an absolute value such as U.S. gallons. Alternatively, units of mass or ratios may be used, without departing from the disclosure. Based on the water loss rate, an estimated amount of water in the gas treating system may be predicted for any point in time. The water content deficit may be calculated for any point in time, based on the difference between the desired amount of water and the estimated amount of water. For example, a current water content deficit may be calculated, and/or a future water content deficit may be calculated. Future water content deficits may be forward-predicted assuming that the parameterization of the gas treating system (e.g., as described in Block 212) is constant, or, if the parameterization is changed, the updated parameterization may be used for the forward-prediction.

In Block 216, a water makeup rate is calculated. In one or more embodiments, the water makeup rate is selected such that the total solvent volume and the solvent strength are maintained, under consideration of the water loss rate, obtained in Block 212. For example, if the current water loss rate is 2 GPM, then the suggested water makeup rate may be at least 2 GPM. Further, the water makeup rate may be increased to compensate for a water content deficit (as determined in Block 214). The water makeup rate may be set to any value, although it may be limited by a known maximum rated capacity of the water injection system (e.g., limited by the maximum capacity of a water makeup feed valve).

In Block 218, an amine injection volume is determined. The execution of Block 218 is optional. For example, Block 218 may not be executed if the desired volume and concentration of the solvent can be accomplished by performing the operations of Blocks 202-216 to adjust the water volume (condensate makeup). The operations of Block 218 may be performed if (based on calculation and/or lab sampling) adjusting the condensate makeup is not sufficient to obtain the desired concentration of amine in the solvent.

In Block 220, a makeup schedule is established. The makeup schedule may be prepared to satisfy the water makeup rate, determined in Block 216. Additional constraints may be considered. For example, an upper limit of the water makeup rate may be established by a maximum capacity of a water makeup feed valve. In order to ensure that the water makeup rate does not exceed the maximum capacity of the water makeup feed valve, the projected schedule may be set under consideration of the upper limit of the water makeup rate. The makeup schedule may also include recommendations for the injection of amine, as determined in Block 218. The makeup schedule may be for any time interval, for example, for a week. Examples with additional details are provided below.

In Block 222, advisory information is provided to a user in an interactive user interface. The advisory information may include various elements, and based on the execution of the described operations, the advisory system may provide recommendations, for example, to a user such as a supervisor of the gas treating system. The recommendations may include instructions or suggestions for condensate makeup and/or amine injection, determined based on the operations as described. The recommendations may be provided via an interactive user interface, e.g., as shown in FIG. 3. The supervisor may take action, based on the recommendations. For example, the supervisor may perform an amine injection, when recommended by the advisory system. The advisory system may then keep monitoring the gas treating system and provide updated recommendations that reflect the result of the amine injection. As further discussed below, the user may use the interactive user interface to change parameters and perform at least some of the previously described operations using the updated parameters. Accordingly, a user may assess different operating scenarios at any time, while relying on input on the current state of the gas treating system, e.g., from the level transmitters. The user may us the interactive user interface to assess the current state, or may forward-predict the state of the gas treating system for a time in the future, e.g., for a week or any other time interval, to identify parameters to be used for operating the gas treating system. The ability to assess the state of the gas treating system at any time enables a tighter control of the solvent parameters. Specifically, for example, the variability of the total solvent volume may be reduced or minimized, thereby also reducing the variability of the amine concentration. With the water content constantly maximized to absorb the energy within the system through vaporization, otherwise occurring amine overhead losses are minimized, in accordance with one or more embodiments. Additional details are provided in reference to the examples shown in FIG. 3

Turning to FIG. 2B, in Block 250, the health of the level transmitters may be checked. Level transmitters may be redundant, i.e., at least two independent measurements may be obtained, e.g., by two or more different sensors. A comparison of the at least two independent measurements may be used to determine whether a level transmitter is malfunctioning. A warning may be issued if a discrepancy exceeds a certain percentage, e.g., 10%. Confirming the health of the level transmitters increases the trustworthiness of the recommendations obtained by performing the operations of Blocks 202-220, as the underlying calculations depend on the values provided by the level transmitters.

Turning to FIG. 3, an example of an interactive user interface (300) is shown. The example illustrates how a user may rely on embodiments as described to maintain solvent quality in an acid gas removal system.

In the example, the interactive user interface (300) includes a table "General Solvent Parameters (310). The general solvent parameters include desired parameter values (column labeled "Optimum Limits"), and corresponding actual or estimated parameter values (in the example, for four systems (columns labeled "GT-100", "GT-200", "GT-300", and "GT-400")). The estimated parameter values may be color coded to indicate whether they are within the optimum limits. For example, a test may be performed to compare an estimated parameter value against the corresponding optimum limits, and the estimated parameter value may be highlighted in green or red depending on whether the estimated parameter is within the optimum limits or not.

Some of parameter values in table (310) may be obtained from a database or set by a user. For example, one or more of the optimum limits may be specific to the gas treating system. Some parameter values may be obtained through measurement and/or may be manually entered. For example, the current sour gas feed may be provided by a sensor, or it may be a setting provided by the user. Similarly, the current condensate makeup may be adjusted by the user if the condensate makeup was changed, or an older value may be kept if no adjustments were made. The current MDEA concentration may be obtained through lab analysis. Some parameter values may be automatically calculated. For example, the calculated water losses may obtained by performing Operation 212, as previously described. Based on a calculated water loss and a corresponding current condensate makeup, a test may be performed to determine whether the current condensate makeup is sufficient to compensate for the calculated water loss. If the current condensate makeup is insufficient, it may be automatically highlighted.

In the example, the interactive user interface (300) further includes a table "Today's AGR Solvent Recommendation" (320). The table "Today's AGR Solvent Recommendation" provides a recommendation for a condensate makeup if needed, and an amine injection, if needed. The recommendation is based on the current sour gas feed and water loss rate. The recommendation for the condensate makeup may be generated as described in Block 216. The recommendation for the amine injection may be generated as described in Block 218. A user may then refer to the recommendations provided in table (320) to make adjustments to the operation of the acid gas removal system.

In the example, the interactive user interface (300) further includes a table "Manual Condensate Makeup Calculation" (330), which displays the total solvent volume and the volume change (after 24 hours, in the example), based on a specified water makeup rate, and under consideration of the current water loss rate (e.g., as calculated in table (310), as previously discussed) or a specified water loss rate. A user may use the manual condensate makeup calculation (330) to experiment with different values for the condensate makeup to observe the resulting volume change over time.

In the example, the interactive user interface (300) further includes a table "Weekly Condensate Makeup Forecast" (340) which provides a weekly forecast of the condensate makeup rate that is needed to ensure that the total solvent volume remains within the desired range. A required makeup rate is provided for each day of the week. The required makeup rates are calculated by making forward predictions (e.g., based on Operation 216) under the assumption of a constant sour gas feed. The calculations may be updated if the sour gas feed changes.

In the example, the interactive user interface (300) also includes a table "Healthiness of Level Transmitters" (350) to display the status of the level transmitters. If, for a pair of redundant level transmitters, a discrepancy of more than 10% is detected, the pair of level transmitter is labeled as "Unhealthy". A display of "#VALUE!" indicates that one or both level transmitters of the pair of redundant level transmitters have failed.

As illustrated by the example of FIG. 3, the advisory system may be used in various different manners. The advisory system may provide daily condensate makeup recommendation, as well as an amine injection volume, if needed. The advisory system may provide 24/7 assistance in the operation of the gas treating solvent system. It is fully automated, provides live monitoring of the gas treating solvent system, automatically highlights any out-of-spec parameters, and its embedded calculations are based on current Total Solvent Volume, Water-Loss Rate, LIMS Solvent Strength, and Current Condensate Makeup Rate. The advisory system is capable of accommodating frequent changes of the sour gas feed rate which results in fluctuating water loss rates. The advisory system also provides a weekly condensate makeup forecast along with the projected total solvent volume to achieve better compliance with the optimum limits, which will ultimately reduce amine overhead losses and degradation. Hence, it will increase an overall gas treating efficiency, in terms of managing solvent losses, while producing on-spec sales gas.

Embodiments may be implemented on a computer system. FIG. 4 is a block diagram of a computer system (402) used to provide computational functionalities associated with described algorithms, methods, functions, processes, flows, and procedures as described in the instant disclosure, according to an implementation. The illustrated computer (402) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or other suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404 includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

In some embodiments, the computer (402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method for maintaining solvent quality in a gas treating system, the method comprising:
calculating, by an advisory system for continuous monitoring of the gas treating system, a water content deficit in a solvent of the gas treating system;
calculating, by the advisory system, a water makeup rate compensating for the water content deficit;
displaying, in an interactive user interface of the advisory system, the water makeup rate;
adjusting the water makeup rate based on the calculated water makeup rate;
determining a health of at least one level transmitter of the gas treating system,
wherein the at least one level transmitter is configured to measure a current total volume of solvent in the gas treating system;
wherein determining the health of the at least one level transmitter comprises comparing a plurality of independent measurements performed by different sensors of the at least one level transmitter, and
wherein a discrepancy of the independent measurements larger than 10% is indicative of a malfunction;
displaying, in an interactive user interface of the advisory system, the health of the at least one level transmitter; and
calculating, by the advisory system, a water loss rate based on a water content of outlet gas streams of the gas treating system,
wherein calculating the water content deficit comprises:
predicting an estimated amount of water in the gas treating system over time; and
determining a difference between a desired amount of water and the estimated amount of water in the gas treating system.

2. The method of claim 1,
wherein the water makeup rate is continuously calculated over time to minimize a variability of total volume of the solvent.

3. The method of claim 1, further comprising:
determining, using measurements obtained from level transmitters, an estimated total volume of the solvent in the gas treating system;
obtaining an estimated strength of the solvent;
calculating, by the advisory system, an estimated amount of water in the gas treating system; and
wherein calculating the water content deficit comprises determining a difference between a desired amount of water and the estimated amount of water in the gas treating system.

4. The method of claim 1, further comprising:
calculating, by the advisory system, an amine content deficit in the solvent of the gas treating system.

5. The method of claim 4, further comprising:
determining, by the advisory system, an amine injection volume compensating for the amine content deficit.

6. The method of claim 1, further comprising:
establishing a makeup schedule comprising the water makeup rate over time, wherein the water makeup rate over time is determined under consideration of a maximum water feed rate.

7. The method of claim 6, wherein the makeup schedule further comprises an amine injection schedule over time.

8. A system for maintaining solvent quality in a gas treating system, the system comprising:
at least one level transmitter of the gas treating system, the at least one level transmitter configured to measure a current total volume of solvent in the gas treating system;
wherein the at least one level transmitter comprises a plurality of different sensors to redundantly measure the current total volume of solvent in the gas treating system;
an advisory system for continuous monitoring of the gas treating system, the advisory system comprising a processor, and configured to:
calculate a water content deficit in a solvent of the gas treating system,
calculate a water makeup rate compensating for the water content deficit, and
determine a health of the at least one level transmitter based on comparing the redundantly measured current total volume of solvent in the gas system,
wherein a discrepancy of the redundantly measured current total volume larger than 10% is indicative of a malfunction, and
calculate a water loss rate based on a water content of outlet gas streams of the gas treating system,
wherein calculating the water content deficit comprises:
predicting an estimated amount of water in the gas treating system over time, and
determining a difference between a desired amount of water and the estimated amount of water in the gas treating system, and
an interactive user interface configured to display the water makeup rate and the health of the at least one level transmitter,
wherein the water makeup rate is adjusted by a user based on the calculated water makeup rate.

9. The system of claim 8, wherein the interactive user interface is further configured to:
based on determining that the water makeup rate is lower than the water-loss rate, highlight the water makeup rate.

10. The system of claim 8, wherein the interactive user interface is further configured to:
display a total solvent volume in the gas treating system over time, determined by the advisory system, based on a specified water loss rate.

11. The system of claim 8, wherein the advisory system is further configured to:
calculate an amine content deficit in the solvent of the gas treating system.

12. The system of claim 11, wherein the advisory system is further configured to:
determine an amine injection volume compensating for the amine content deficit.

13. A non-transitory machine-readable medium comprising a plurality of machine-readable instructions executed by one or more processors of an advisory system, the plurality of machine-readable instructions causing the one or more processors to perform operations comprising:

calculating a water content deficit in a solvent of the gas treating system;

calculating a water makeup rate compensating for the water content deficit; and displaying, in an interactive user interface of the advisory system, the water makeup rate;

adjusting the water makeup rate based on the calculated water makeup rate;

determining a health of at least one level transmitter of the gas treating system, wherein the at least one level transmitter is configured to measure a current total volume of solvent in the gas treating system, wherein determining the health of the at least one level transmitter comprises comparing a plurality of independent measurements performed by different sensors of the at least one level transmitter, and wherein a discrepancy of the independent measurements larger than 10% is indicative of a malfunction;

displaying the health of the at least one level transmitter; and calculating a water loss rate based on a water content of outlet gas streams of the gas treating system, wherein calculating the water content deficit comprises:
predicting an estimated amount of water in the gas treating system over time; and
determining a difference between a desired amount of water and the estimated amount of water in the gas treating system.

* * * * *